(12) United States Patent
Ideshio et al.

(10) Patent No.: US 8,974,339 B2
(45) Date of Patent: Mar. 10, 2015

(54) VEHICLE POWER TRANSMISSION DEVICE

(75) Inventors: Yukihiko Ideshio, Nisshin (JP);
Terufumi Miyazaki, Toyota (JP);
Toshihiko Kamiya, Toyota (JP); Shingo Eto, Gamagori (JP); Hironori Asaoka, Nisshin (JP); Yasuyuki Kato, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 40 days.

(21) Appl. No.: 13/989,332

(22) PCT Filed: Nov. 24, 2010

(86) PCT No.: PCT/JP2010/070900
§ 371 (c)(1),
(2), (4) Date: Jul. 3, 2013

(87) PCT Pub. No.: WO2012/070118
PCT Pub. Date: May 31, 2012

(65) Prior Publication Data
US 2014/0256506 A1    Sep. 11, 2014

(51) Int. Cl.
*B60W 10/02*    (2006.01)
*B60W 10/08*    (2006.01)
*F16H 41/24*    (2006.01)
(Continued)

(52) U.S. Cl.
CPC ............ *B60W 10/023* (2013.01); *F16H 41/24* (2013.01); *F16H 45/02* (2013.01); *F16H 2045/002* (2013.01); *B60K 6/48* (2013.01); *B60K 2006/4825* (2013.01); *Y02T 10/6221* (2013.01); *Y02T 10/6252* (2013.01); *B60W 10/08* (2013.01); *B60W 2510/02* (2013.01); *Y10S 903/902* (2013.01); *B60K 6/365* (2013.01)
USPC ..... 475/5; 475/35; 475/286; 477/5; 192/3.21; 903/902

(58) Field of Classification Search
USPC .................................. 192/3.21; 477/5; 475/35
See application file for complete search history.

(56) References Cited

U.S. PATENT DOCUMENTS 2,727,360 A * 12/1955 Kelley ............................ 60/345
6,066,058 A   5/2000 Kashiwase
(Continued)

FOREIGN PATENT DOCUMENTS

JP    Y1-33-11510    8/1958
JP    Y1-37-30631    11/1962
(Continued)

*Primary Examiner* — David D Le
*Assistant Examiner* — Colby M Hansen
(74) *Attorney, Agent, or Firm* — Oliff PLC

(57) ABSTRACT

A vehicle power transmission device has a torque converter including an input-side rotating member, an output-side rotating member, a stator and a case including a first chamber and a second chamber separated by a bulkhead, and the first chamber and the second chamber being oil-tightly isolated from each other by an oil seal. The vehicle power transmission device is disposed with a thrust bearing between the input-side rotating member and the stator, which is disposed to partially or entirely overlap with the oil seal and a one way clutch disposed between the stator and a non-rotating member which supports the stator. A portion of the one way clutch protrudes toward the second chamber, the input-side rotating member having an annular projecting portion, and the annular projecting portion houses the thrust bearing and the portion of the one way clutch.

7 Claims, 4 Drawing Sheets

(51) Int. Cl.
  *B60K 6/48* (2007.10)
  *B60K 6/365* (2007.10)
  *F16H 45/02* (2006.01)
  *F16H 45/00* (2006.01)

(56) References Cited

U.S. PATENT DOCUMENTS

| | | |
|---|---|---|
| 2002/0027053 A1 | 3/2002 | Back et al. |
| 2004/0050639 A1 | 3/2004 | Back et al. |
| 2005/0126874 A1 | 6/2005 | Back et al. |
| 2008/0142325 A1 | 6/2008 | Degler et al. |
| 2008/0149440 A1 | 6/2008 | Sturgin |
| 2008/0156608 A1 | 7/2008 | Kombowski |
| 2008/0308375 A1 | 12/2008 | Heeke |
| 2009/0032351 A1 | 2/2009 | Uhler |
| 2009/0045023 A1 | 2/2009 | Uhler |
| 2009/0054203 A1 | 2/2009 | Heeke |
| 2010/0105519 A1 | 4/2010 | Kasuya et al. |
| 2012/0186242 A1* | 7/2012 | Roses et al. .................. 60/345 |

FOREIGN PATENT DOCUMENTS

| | | |
|---|---|---|
| JP | A-11-125322 | 5/1999 |
| JP | A-2001-355704 | 12/2001 |
| JP | A-2006-300135 | 11/2006 |
| JP | A-2007-022112 | 2/2007 |
| JP | A-2008-138877 | 6/2008 |
| JP | A-2009-001127 | 1/2009 |
| JP | A-2009-002511 | 1/2009 |
| JP | A-2010-105450 | 5/2010 |
| JP | A-2010-120543 | 6/2010 |
| KR | 10-0755046 B1 | 9/2007 |

* cited by examiner

VEHICLE POWER TRANSMISSION DEVICE

This application is a National Stage Application of PCT/JP2010/070900, filed Nov. 24, 2010. The disclosure of the prior application is hereby incorporated by reference herein in its entirety.

TECHNICAL FIELD

The present invention relates to a structure of a vehicle power transmission device making up a portion of a power transmission path between an engine and drive wheels.

BACKGROUND ART

A vehicle power transmission device is known that has a torque converter in a power transmission path between an engine and drive wheels, the torque converter including an input-side rotating member disposed with a plurality of pump blades, an output-side rotating member disposed with a plurality of turbine blades receiving a fluid flow from the pump blades, and a stator disposed with a stator blade disposed between the pump blades and the turbine blades. For example, this corresponds to those described in Patent Documents 1 to 4.

PRIOR ART DOCUMENTS

Patent Documents

Patent Document 1: Japanese Laid-Open Patent Publication No. 2010-105450
Patent Document 2: Japanese Laid-Open Patent Publication No. 2008-138877
Patent Document 3: Korean Patent Publication No. KR100755046 (B1)
Patent Document 4: Japanese Laid-Open Patent Publication No. 2007-22112

SUMMARY OF THE INVENTION

Problem to be Solved by the Invention

In the conventional vehicle power transmission device, it is desired to further reduce the entire axial length of the vehicle power transmission device to improve mountability on a vehicle. In this regard, for example, it is conceivable that constituent members of a torque converter are made thinner in an axial center direction of the torque converter to shorter axial lengths to reduce a distance in the axial center direction occupied by the torque converter in the vehicle power transmission device, thereby reducing the entire axial length of the vehicle power transmission device. However, the thinning of the constituent members is limited. The following is considered as one of the factors making the torque converter longer in the axial center direction. A predetermined width dimension in the axial center direction is required for a one way clutch housed in an outer shell cover of the torque converter and interposed between a stator and, for example, a case member, so as to ensure a predetermined torque capacity.

The present invention was conceived in view of the situations and it is therefore an object of the present invention to provide a vehicle power transmission device including a torque converter and enabling a shorter entire axial length.

Means for Solving the Problem

To achieve the object, the present invention provides (a) a vehicle power transmission device having a torque converter in a power transmission path between an engine and drive wheels, the torque converter including an input-side rotating member disposed with a plurality of pump blades, an output-side rotating member disposed with a plurality of turbine blades receiving a fluid flow from the pump blades, and a stator disposed with a stator blade disposed between the pump blades and the turbine blades, the vehicle power transmission device comprising: (b) a case including a first chamber and a second chamber separated by a bulkhead disposed on an opposite side of the torque converter to the engine, the first chamber housing the torque converter, the second chamber being formed on an opposite side of the bulkhead to the torque converter, (c) the first chamber and the second chamber being oil-tightly isolated from each other by an oil seal oil-tightly sealing a gap between an inner circumferential surface of the bulkhead and an outer circumferential surface of a cylindrical rotation shaft projected from the input-side rotating member toward the second chamber, (d) the vehicle power transmission device being disposed with a thrust bearing between a side wall portion of the input-side rotating member closer to the bulkhead and the stator, (e) the thrust bearing being disposed to partially or entirely overlap with the oil seal when viewed in a direction orthogonal to an axial center of the torque converter.

Effects of the Invention

Consequently, as compared to the case that the thrust bearing is not overlapped with the oil seal when viewed in the direction orthogonal to the axial center, the thrust bearing and members disposed adjacent thereto, for example, a one way clutch interposed between the stator and, for example, a case member, can be arranged closer to the bulkhead and, therefore, a distance can be reduced between the entire outer shell cover of the torque converter, which houses the thrust bearing and the one way clutch, and the bulkhead. Therefore, the entire axial length of the vehicle power transmission device can be made shorter.

Preferably, (a) the input-side rotating member has an annular projecting portion formed by projecting a portion at a radial position corresponding to the thrust bearing toward the bulkhead over entire circumference in the side wall portion of the input-side rotating member closer to the bulkhead, (b) the thrust bearing is disposed within the annular projecting portion. Consequently, the thrust bearing and the one way clutch can be arranged closer to the bulkhead and, therefore, the distance can be reduced between the entire outer shell cover of the torque converter, which houses the thrust bearing and the one way clutch, and the bulkhead. Therefore, the entire axial length of the vehicle power transmission device can be made shorter.

Preferably, the torque converter includes an engine intermittent clutch selectively coupling the crankshaft of the engine and the input-side rotating member of the torque converter such that the engine intermittent clutch is housed within the input-side rotating member on the engine side of the output-side rotating member and partially or entirely overlaps with the oil seal and the thrust bearing when viewed in a direction parallel to the axial center. According to the present invention, since the thrust bearing and the one way clutch are disposed closer to the bulkhead, the engine intermittent clutch can compactly be disposed in an available space toward the engine side in the outer shell cover of the torque converter.

Preferably, (a) an electric motor disposed on a second axial center parallel to the axial center and coupled to the input-side rotating member via each of the cylindrical rotation shaft and an electric motor coupling rotating member coupled to the cylindrical rotation shaft is comprised, (b) the bulkhead has a supporting portion formed by projecting a portion at a radial position toward the second chamber over entire circumference, (c) the electric motor coupling rotating member is rotatably supported via a bearing by the supporting portion of the bulkhead, and (d) the annular projecting portion is positioned on an inner circumferential side of the supporting portion of the bulkhead. Consequently, for example, vehicle fuel efficiency can be improved by assisting the output of the engine with the electric motor during vehicle running with the engine or by driving the vehicle with the electric motor while the engine is stopped. Even when the electric motor coupling rotating member and the supporting portion of the bulkhead for the rotatable support thereof are disposed to couple the electric motor to the input-side rotating member of the torque converter, the thrust bearing and the one way clutch can be disposed closer to the bulkhead.

Preferably, (a) a power transmission mechanism disposed on the side opposite to the engine relative to the torque converter in the axial center direction to transmit power from the torque converter to the drive wheels is comprised, (b) the output-side rotating member is coupled to an input shaft of the power transmission mechanism on the power transmission mechanism side relative to the pump blades in the axial center direction, (c) the stator is relatively non-rotatably coupled via the one way clutch to a stator shaft, and (d) a coupling portion of an inner race of the one way clutch to the stator shaft and a coupling portion of the output-side rotating member to the input shaft are disposed to partially or entirely overlap with each of the thrust bearing and the oil seal when viewed in a direction orthogonal to the axial center. Consequently, the coupling portion of the output-side rotating member to the input shaft and the coupling portion of the inner race of the one way clutch to the stator shaft are disposed out of the outer shell cover of the torque converter in the axial center direction. Therefore, as compared to the case that the coupling portions are disposed within the outer shell cover, the length of the outer shell cover in the axial center direction can be made shorter and, therefore, the entire axial length of the vehicle power transmission device can be made shorter.

BEST MODES FOR CARRYING OUT THE INVENTION

An embodiment of the present invention will now be described in detail with reference to the drawings. The figures are simplified or deformed as needed in the following embodiment and portions are not necessarily precisely depicted in terms of dimension ratio, shape, etc.

First Embodiment

Figure 1:
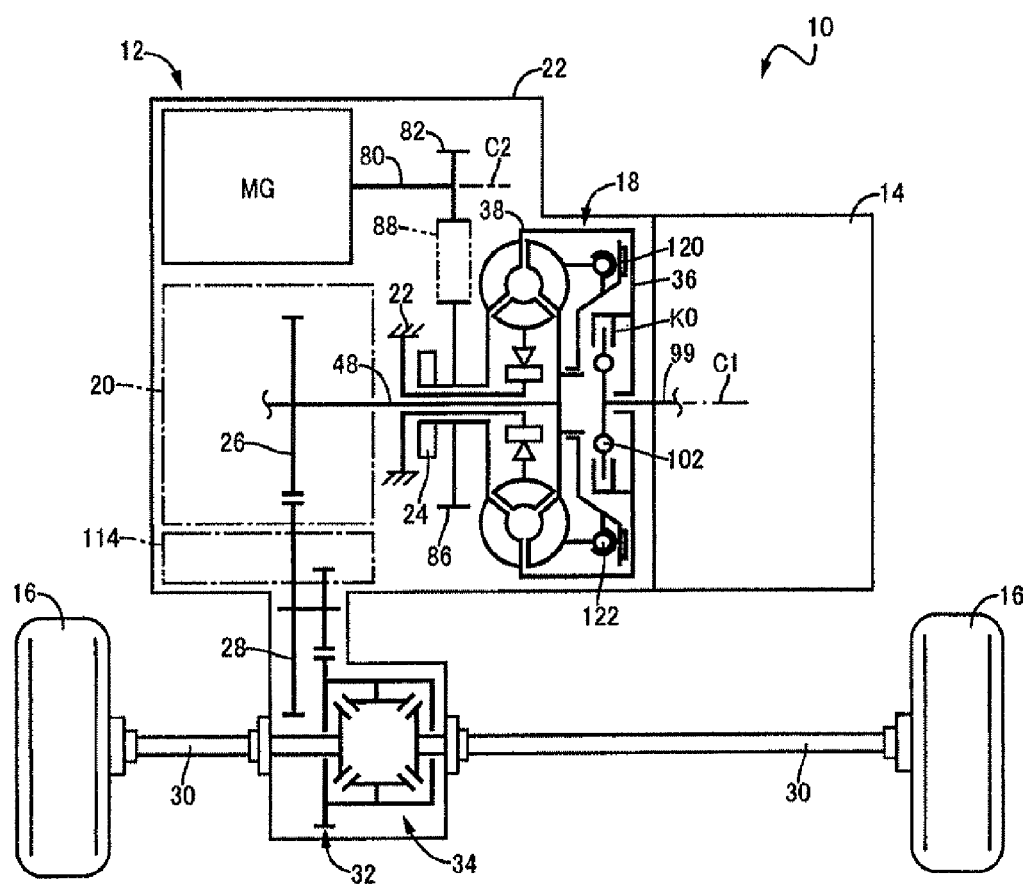
FIG. 1 is a diagram of a power transmission path in a vehicle including a vehicle power transmission device of an embodiment of the present invention, from an engine acting as a drive power source of the vehicle via the power transmission device to drive wheels.
Figure 2:
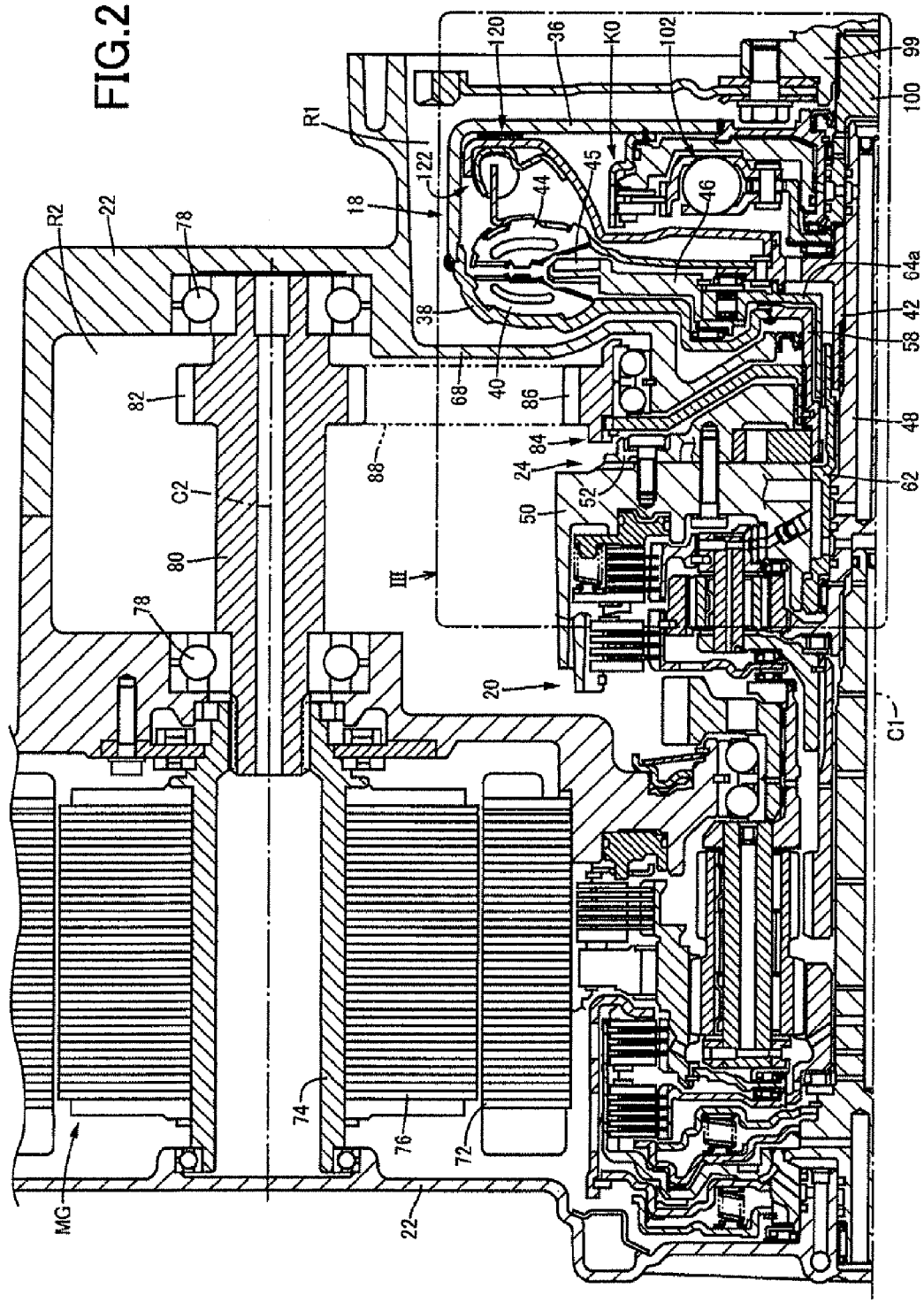
FIG. 2 is a cross-sectional view of a main portion of the power transmission device of FIG. 1.

FIG. 1 is a diagram of a power transmission path in a vehicle 10 including a vehicle power transmission device 12 (hereinafter referred to as a "power transmission device 12") of an embodiment of the present invention, from an engine 14 acting as a drive power source of the vehicle 10 via the power transmission device 12 to drive wheels 16. FIG. 2 is a cross-sectional view of a main portion of the power transmission device 12, i.e., a torque converter 18, an automatic transmission 20, an electric motor MG, etc. A first axial center C1 is an axial center of the torque converter 18, the automatic transmission 20, etc. In FIG. 2, a lower half from the first axial center C1 is not depicted.

As depicted in FIG. 1, the power transmission device 12 has a transaxle case (case) 22 attached to a vehicle body by bolts etc., and includes the torque converter 18, an oil pump 24, and the automatic transmission 20 disposed in the power transmission path between the engine 14 and the drive wheels 16 and arranged on the first axial center C1 in this order in series from the engine 14 side in the transaxle case 22. The power transmission device 12 also includes the electric motor MG disposed on a second axial center C2 parallel to the first axial center C1 and coupled to an input-side rotating member (a rear cover 38 described later) of the torque converter 18 in a power transmittable manner. The second axial center C2 corresponds to a second axial center parallel to the axial center of the torque converter 18.

In the transaxle case 22, the power transmission device 12 includes a counter driven gear 28 disposed integrally with a rotation shaft parallel to the first axial center C1 and engaged with an output gear 26 that is an output member of the automatic transmission 20, a final gear pair 32 disposed between the rotation shaft parallel to the first axial center C1 and a pair of axles 30, and a differential gear device 34 transmitting the power from a driven gear of the final gear pair 32 to each of a pair of the axles 30.

The power transmission device 12 configured as described above is transversely mounted along with the engine 14 on the front side of the front-wheel drive, i.e., FF (front-engine front-drive) type vehicle 10, for example. The vehicle 10 is driven by at least one of the engine 14 and the electric motor MG. For driving the vehicle 10, the power from the engine 14 and the electric motor MG is transmitted sequentially through the torque converter 18, the automatic transmission 20, the counter driven gear 28, the final gear pair 32, the differential gear device 34, and a pair of the axles 30 to each of a pair of the drive wheels 16.

The devices included in the power transmission device 12 will hereinafter be described in detail with reference to FIGS. 2 to 5.

The automatic transmission 20 is a well-known stepped transmission and corresponds to a power transmission mechanism of the present invention disposed on the opposite side to the engine 14 relative to the torque converter 18 in the first axial center C1 direction to transmit power input from the torque converter 18 to the subsequent stage.

The torque converter 18 is a hydraulic power transmission device making up a portion of the power transmission path between the engine 14 and the drive wheels 16. As depicted in FIG. 2, the torque converter 18 includes a front cover 36 and the rear cover 38 disposed on the first axial center C1 in this order from the engine 14 side and integrally coupled to each other to be rotatable around the first axial center C1. The front cover 36 is a bottomed cylindrical member opened toward the automatic transmission 20 and the rear cover 38 is a disk-shaped member having an outer circumferential end portion curved toward the engine 14, i.e., toward the front cover 36, and fixed to an opening end portion of the front cover 36 by welding, for example.

The front cover 36 and the rear cover 38 are allowed to function as an input-side rotating member rotated by input of the power from the engine 14 via an engine intermittent clutch K0. A plurality of circumferentially arranged pump blades 40 is fixedly disposed on the inside of the rear cover 38.

The torque converter 18 includes a turbine 42 disposed with a plurality of turbine blades 44 opposite to the pump blades 40 on the rear cover 38 side of the pump blades 40 and circumferentially arranged on an outer circumferential portion of a disk portion 42c coupled by rivets to an outer circumferential portion of a flange portion 42b to receive a fluid flow from the pump blades 40, and a stator 46 disposed with stator blade 45 disposed between the pump blades 40 and the turbine blades 44. The turbine 42 is allowed to function as an output-side rotating member of the torque converter 18 and relatively non-rotatably coupled by spline fitting to an outer circumferential surface of an input shaft 48 of the automatic transmission 20.

The front cover 36 and the rear cover 38 have a function of an outer shell cover of the torque converter 18 housing the pump blades 40, the turbine blades 44, the turbine 42, the stator blade 45, the stator 46, and the fluid flowing from the pump blades 40 to the turbine blades 44.

Figure 3:
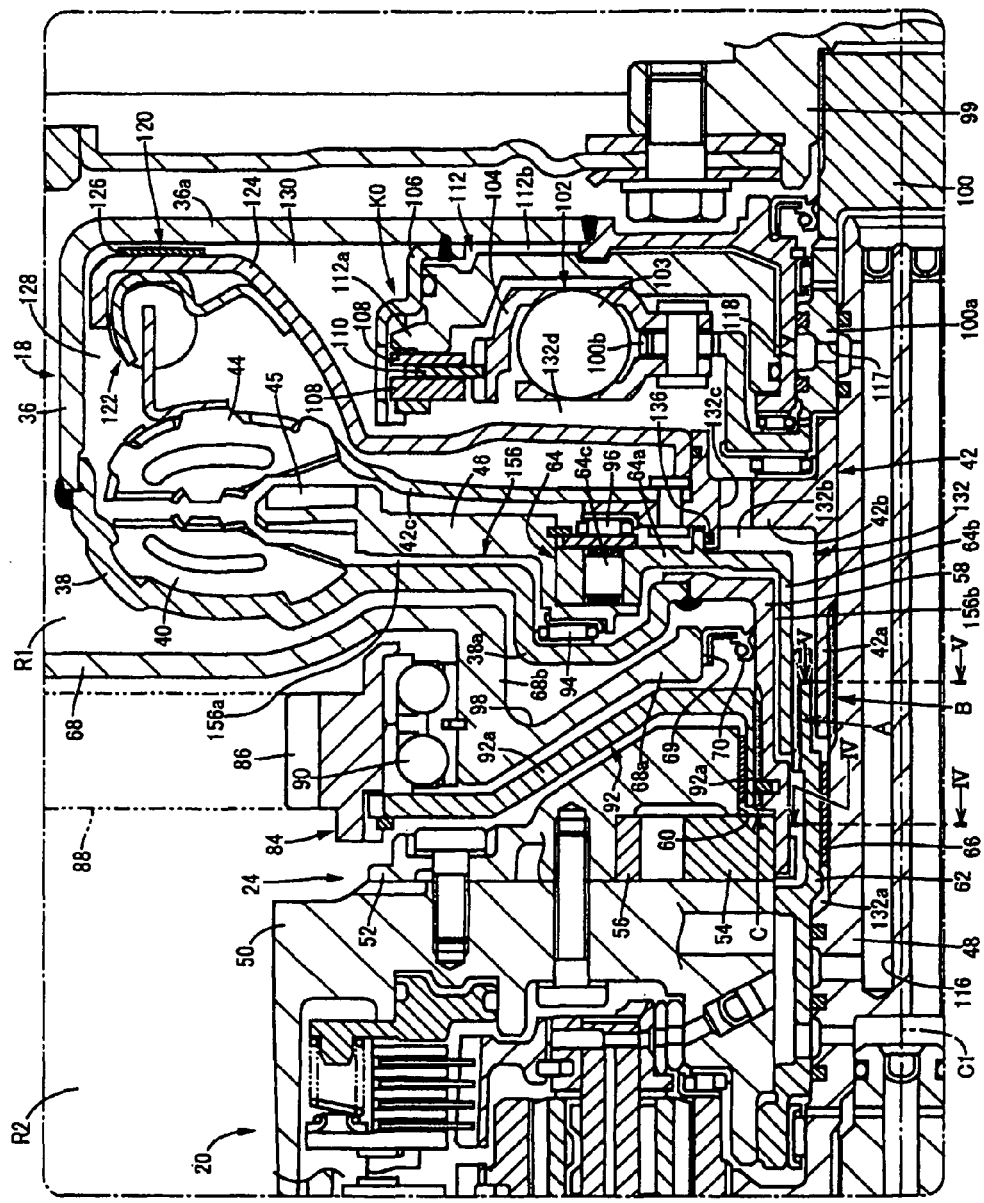
FIG. 3 is an enlarged diagram of a portion indicated by an arrow III surrounded by a dashed-dotted line of FIG. 2.

FIG. 3 is an enlarged diagram of a portion indicated by an arrow III surrounded by a dashed-dotted line of FIG. 2. As depicted in FIG. 3, the well-known internal gear oil pump 24 is disposed between the torque converter 18 and the automatic transmission 20. The oil pump 24 includes a pump cover 50 as a non-rotating member fixed to the transaxle case 22, a pump body 52 disposed on the rear cover 38 side of the pump cover 50 and integrally fixed to the pump cover 50, and an internal gear pair, i.e., a drive gear 54 and a driven gear 56, engaged with each other and rotatably housed in a pump chamber formed by the pump cover 50 and the pump body 52.

The oil pump 24 configured as described above is rotationally driven by a tubular pump drive shaft 58 concentric with the input shaft 48 and larger in diameter than the input shaft 48 and projected from the rear cover 38 toward the automatic transmission 20. The tubular pump drive shaft 58 is inserted through a through-hole 60 formed in the pump body 52 and relatively non-rotatably coupled to the drive gear 54.

On the inner circumferential side of the pump cover 50, a tubular stator shaft 62, i.e., a non-rotating member concentric with the input shaft 48 and having a diameter larger than the input shaft 48 and smaller than the tubular pump drive shaft 58, is relatively non-rotatably coupled to the pump cover 50.

The stator 46 of the torque converter 18 is coupled via a one way clutch 64 and a tubular coupling shaft 64b projected in the first axial center C1 direction from an inner circumferential edge portion of a disk-shaped inner race 64a of the one way clutch 64 to the stator shaft 62 that is the non-rotating member. The tubular coupling shaft 64b is a cylindrical member having a diameter larger than the input shaft 48 and the stator shaft 62 and smaller than the tubular pump drive shaft 58. The one way clutch 64 includes a sprag 64c having a predetermined dimension in the first axial center C1 direction larger than the thicknesses of the stator 46 and the inner race 64a so as to have a sufficient torque capacity for inhibiting inverse rotation of the stator 46 at the time of torque amplification of the torque converter 18. Therefore, the one way clutch 64 is disposed protruding toward the automatic transmission 18 as compared to the stator 46 and the inner race 64a.

As indicated by an arrow A in FIG. 3, a leading end portion of the tubular coupling shaft 64b projected from the inner circumferential edge portion of the inner race 64a is relatively non-rotatably coupled by spline fitting to an end portion of the stator shaft 62 at a position closer to the automatic transmission 20 than the pump blades 40 in a direction orthogonal to the first axial center C1, i.e., outside the outer shell cover of the torque converter 18.

A coupling portion (spline fitting portion) of the tubular coupling shaft 64b to the stator shaft 62 is disposed to partially overlap with the pump body 52 of the oil pump 24 when viewed in a direction orthogonal to the first axial center C1. The pump body 52 of the oil pump 24 is a member disposed at a position closer to the automatic transmission 20 than the pump blades 40 in the first axial center C1 direction, i.e., at a position closer to the automatic transmission 20 than the outer shell cover of the torque converter 18.

The input shaft 48 of the automatic transmission 20 is rotatably supported via a bush (bearing member) 66 by the stator shaft 62 on the inner circumferential side of the stator shaft 62.

The turbine 42 of the torque converter 18 has a cylindrical boss portion 42a relatively non-rotatably coupled by spline fitting to an outer circumferential portion of the input shaft 48 of the automatic transmission 20, a flange portion 42b projected radially outward from a portion of an outer circumferential surface of the boss portion 42a on the engine 14 side of the inner race 64a of the one way clutch 64, and a disk portion 42c riveted to an outer circumferential portion of the flange portion 42b. As indicated by an arrow B in FIG. 3, the boss portion 42a is relatively non-rotatably fitted and coupled to the input shaft 48 at a position closer to the automatic transmission 20 than the pump blades 40 in the first axial center C1 direction, i.e., at a position closer to the automatic transmission 20 than the outer shell cover of the torque converter 18.

The boss portion 42a of the turbine 42 is coupled to the input shaft 48 at a position closer to the automatic transmission 20 than a position in the rear cover 38 at which the pump blades 40 are fixed in the first axial center C1 direction.

The stator shaft 62 is relatively non-rotatably fitted and coupled to the tubular coupling shaft 64b of the one way clutch 64 at a position partially overlapping with a coupling portion of the turbine 42 to the input shaft 48 when viewed in the first axial center C1 direction.

The coupling portion of the turbine 42 to the input shaft 48 is disposed to partially overlap with the pump body 52 of the oil pump 24 when viewed in a direction orthogonal to the first axial center C1.

The bush 66 is disposed at a position closer to the automatic transmission 20 than the coupling position of the turbine 42 to the input shaft 48 in the first axial center C1 direction, i.e., at a position closer to the automatic transmission 20 than the outer shell cover of the torque converter 18, so as to partially overlap with the pump body 52 and the drive gear 54 of the oil pump 24 when viewed in the direction orthogonal to the first axial center C1.

The transaxle case 22 has a first chamber R1 housing the torque converter 18 etc., and a second chamber R2 housing the automatic transmission 20, the electric motor MG, the oil pump 24, etc. The first chamber R1 and the second chamber R2 are separated by a bulkhead 68 disposed between the rear cover 38 of the torque converter 18 and the pump body 52 of the oil pump 24 on the outer circumferential side of the tubular pump drive shaft 58 and are oil-tightly sealed from each other by an oil seal 70 oil-tightly sealing a gap between an inner circumferential surface of a through-hole 69 formed in the bulkhead 68 to allow insertion of the tubular pump drive shaft 58 and an outer circumferential surface of the tubular pump drive shaft 58.

A side surface of the pump body 52 closer to the rear cover 38 is inclined radially outward in a tapered shape toward the pump cover 50, i.e., away from the rear cover 38. An inner circumferential portion 68a of the bulkhead 68 is inclined radially outward toward the pump body 52, i.e., away from the rear cover 38 as is the case with the side surface of the pump body 52.

The bulkhead 68 and the oil seal 70 are members disposed at positions closer to the automatic transmission 20 than the pump blades 40 in the first axial center C1 direction, i.e., at positions closer to the automatic transmission 20 than the outer shell cover of the torque converter 18. The coupling portion of the turbine 42 to the input shaft 48 is disposed to partially overlap with the oil seal 70 and the bulkhead 68 when viewed in the direction orthogonal to the first axial center C1.

The electric motor MG is a so-called motor generator having a motor function and an electric generation function. As depicted in FIG. 2, the electric motor MG includes an electric motor stator 72 fixed to an inner wall surface of the transaxle case 22 by bolts, for example; an electric motor output shaft 74 disposed rotatably around the second axial center C2 parallel to the first axial center C1 on the inner circumferential side of the electric motor stator 72; and an electric motor rotor 76 fixedly disposed on an outer circumferential portion of the electric motor output shaft 74 on the inner circumferential side of the electric motor stator 72.

The electric motor output shaft 74 is relatively non-rotatably coupled, for example, by spline fitting, via a pair of first bearings 78 to a power transmission rotation shaft 80 supported rotatably around the second axial center C2 by the transaxle case 22. The power transmission rotation shaft 80 is coupled in a power transmittable manner to an electric motor coupling rotating member 84 via an endless annular transmission chain 88 wrapped around a first electric motor coupling gear 82 disposed integrally with an outer circumferential portion of the power transmission rotation shaft 80 and a second electric motor coupling gear 86 included in an outer circumferential portion of the electric motor coupling rotating member 84 coupled to the tubular pump drive shaft 58. The first electric motor coupling gear 82 and the second electric motor coupling gear 86 are gears for transmitting the power from the electric motor MG to the tubular pump drive shaft 58. The electric motor MG is operatively coupled sequentially through the power transmission rotation shaft 80, the transmission chain 88, the electric motor coupling rotating member 84, and the tubular pump drive shaft 58 to the rear cover 38 that is the input-side rotating member of the torque converter 18.

As depicted in FIG. 3, the second electric motor coupling gear 86 is disposed at a position closer to the automatic transmission 20 than the pump blades 40 in the first axial center C1 direction, i.e., at a position closer to the automatic transmission 20 than the outer shell cover of the torque converter 18. The coupling portion of the turbine 42 to the input shaft 48 is disposed to partially overlap with the second electric motor coupling gear 86 when viewed in the direction orthogonal to the first axial center C1.

The electric motor coupling rotating member 84 includes the second electric motor coupling gear 86 supported rotatably around the first axial center C1 via a second bearing 90 by a supporting portion 68b formed in a radially intermediate portion of the bulkhead 68, and a flange-shaped coupling member 92 coupling the second electric motor coupling gear 86 and the tubular pump drive shaft 58. The supporting portion 68b of the bulkhead 68 is formed by projecting a portion of the bulkhead 68 at a radial position located on the outer circumferential side of the inner circumferential portion 68a toward the second chamber R2 over the entire circumference. The electric motor coupling rotating member 84 has an inner circumferential surface of the second electric motor coupling gear 86 rotatably supported via the second bearing 90 by the supporting portion 68b of the bulkhead 68.

The second bearing 90 and the supporting portion 68b are disposed at positions closer to the automatic transmission 20 than the pump blades 40 in the first axial center C1 direction, i.e., at positions closer to the automatic transmission 20 than the outer shell cover of the torque converter 18. The coupling portion of the turbine 42 to the input shaft 48 is disposed to partially overlap with the second bearing 90 and the supporting portion 68b of the bulkhead 68 when viewed in the direction orthogonal to the first axial center C1.

As indicated by an arrow C in FIG. 3, the coupling member 92 of the electric motor coupling rotating member 84 has a cylindrical boss portion 92a relatively non-rotatably coupled by spline fitting to an outer circumferential portion of the tubular pump drive shaft 58 on the inner circumferential side of the through-hole 60 of the pump body 52. The coupling member 92 has a flange portion 92b that is projected radially outward from one end portion of the boss portion 92a closer to the bulkhead 68, that is inclined radially outward toward the pump body 52, i.e., away from the rear cover 38 as is the case with the side surface of the pump body 52 and the bulkhead 68 disposed adjacently in the first axial center C1 direction, and that is coupled by spline fitting at an outer circumferential end portion to the second electric motor coupling gear 86. The coupling portion of the turbine 42 to the input shaft 48 is disposed to partially overlap with a coupling portion (spline fitting portion) of the coupling member 92 to the tubular pump drive shaft 58 when viewed in the direction orthogonal to the first axial center C1.

A first thrust bearing 94 is disposed between a side wall portion of the rear cover 38 closer to the bulkhead 68 and the stator 46, and the rear cover 38 and the stator 46 are disposed rotatably relative to each other via the first thrust bearing 94. A second thrust bearing 96 is interposed between the stator 46 and the flange portion 42b of the turbine 42, and the stator 46 and the turbine 42 are disposed rotatably relative to each other via the second thrust bearing 96.

An annular groove 98 is formed on the inner circumferential side of the supporting portion 68b of the bulkhead 68. The rear cover 38 has an annular projecting portion 38a formed by projecting a radial portion corresponding to the first thrust bearing 94 in the side wall portion of the rear cover 38 closer to the bulkhead 68 toward the inner circumferential portion 68a of the bulkhead 68, i.e., toward the annular groove 98 over the entire circumference. The annular projecting portion 38a is positioned in the annular groove 98 on the inner circumferential side of the supporting portion 68b of the bulkhead 68. The first thrust bearing 94 and a portion of the one way clutch 64 projected from the stator 46 and the inner race 64a are housed inside the annular projecting portion 38a. Therefore, the one way clutch 64 is disposed protruding toward the automatic transmission 18 as compared to the stator 46 and the inner race 64a. The first thrust bearing 94 is disposed to partially overlap with each of the inner circumferential portion 68a and the supporting portion 68b of the bulkhead 68 and the oil seal 70 when viewed in the direction orthogonal to the first axial center C1. The coupling portion of the turbine 42 to the input shaft 48 and the coupling portion of the tubular coupling shaft 64b to the stator shaft 62 are disposed to partially overlap with each of the first thrust bearing 94 and the oil seal 70 when viewed in the direction orthogonal to the first axial center C1.

An output end portion of a crankshaft 99, i.e., an output shaft of the engine 14, is coupled to an engine coupling shaft 100 by spline fitting, for example. The engine coupling shaft 100 is disposed concentrically with the input shaft 48 and a leading end portion of the input shaft 48 of the automatic transmission 20 is relatively rotatably fit into a fitting hole formed on the inner circumferential side of a cylindrical shaft end portion 100a of the engine coupling shaft 100 on the opposite side to the crankshaft 99 and is rotatably supported by the cylindrical shaft end portion 100a.

The engine coupling shaft 100 has a flange portion 100b projected radially outward from the cylindrical shaft end portion 100a. The flange portion 100b is disposed with a first damper 102 inserted in a power transmission path between the crankshaft 99 of the engine 14 and the front cover 36 of the torque converter 18. The first damper 102 includes a damper elastic member 103 made of a spring, rubber, etc., interposed between the input/output members and is a shock absorber causing torsion between the input/output members depending on transmission torque to absorb impact and pulsation. Engine torque is transmitted to the torque converter 18 with pulsation thereof suppressed by the first damper 102. The first damper 102 is a damper inserted in the power transmission path between the engine 14 and the electric motor MG The torque converter 18 includes the engine intermittent clutch K0 selectively coupling the crankshaft 99 of the engine 14 and the front cover 36 of the torque converter 18 such that the engine intermittent clutch K0 is disposed closer to the engine 14 relative to the turbine 42 and housed in the front cover 36.

The engine intermittent clutch K0 is a wet multiplate clutch including a clutch hub 104 coupled via the first damper 102 to the crankshaft 99 and also acting as an output member of the first damper 102, a cylindrical clutch drum 106 integrally fixed to the front cover 36 of the torque converter 18 on the outer circumferential side of the clutch hub 104, a pair of first friction plates 108 arranged in a gap between the clutch hub 104 and the clutch drum 106 to overlap with each other when viewed in a direction parallel to the first axial center C1 and each relatively non-rotatably engaged with the clutch drum 106, a second friction plate 110 disposed between a pair of the friction plates 108 and relatively non-rotatably engaged with the clutch hub 104, and a hydraulic actuator 112 pressing the first friction plates 108 and the second friction plate 110 in an overlapping direction thereof, i.e., in a direction parallel to the first axial center C1, to frictionally engage the first friction plates 108 and the second friction plates 110 with each other so that the clutch hub 104 and the clutch drum 106 are coupled to each other. The engine intermittent clutch K0 transmits torque through a friction surface between one of a pair of the first friction plates 108 and the second friction plate 110 and a friction surface between the other of a pair of the first friction plates 108 and the second friction plate 110. In other words, the engine intermittent clutch K0 couples the clutch hub 104 and the clutch drum 106 to each other via the two friction surfaces. The engine intermittent clutch K0 is located on the inner circumferential side of a lockup clutch 120 described later and is disposed to partially overlap with the lockup clutch 120 when viewed in the direction orthogonal to the first axial center C1.

The hydraulic actuator 112 has a piston 112a disposed closer to a side wall portion 36a of the front cover 36 relative to the first friction plates 108 and the second friction plate 110, and a pressure chamber 112b formed by being surrounded by the piston 112a, the front cover 36, and the clutch drum 106. The pressure chamber 112b is supplied with operating oil from a hydraulic control circuit 114 through a first oil passage 116 formed within the input shaft 48 of the automatic transmission 20 in the first axial center C1 direction in communication with the hydraulic control circuit 114 (see FIG. 1) outputting the operating oil with a pressure adjusted by using an oil pressure generated by the oil pump 24 as an original pressure, a second oil passage 117 formed in the cylindrical shaft end portion 100a of the engine coupling shaft 100 in communication with the first oil passage 116, and a third oil passage 118 formed in the front cover 36 in communication with the second oil passage 117.

The engine intermittent clutch K0 is subjected to engagement/release control by the hydraulic control circuit 114. In the engagement/release control, a power-transmittable torque capacity of the engine intermittent clutch K0, i.e., an engagement force of the engine intermittent clutch K0 is varied, for example, continuously, through pressure adjustment of a linear solenoid valve etc., in the hydraulic control circuit 114. In the engaged state of the engine intermittent clutch K0, the front cover 36 acting as the input-side rotating member of the torque converter 18 is integrally rotated with the crankshaft 99 of the engine 14. Therefore, in the engaged state of the engine intermittent clutch K0, the power from the engine 14 is input via the first damper 102 to the front cover 36 of the torque converter 18. On the other hand, in the released state of the engine intermittent clutch K0, power transmission is interrupted between the front cover 36 of the torque converter 18 and the engine 14.

The torque converter 18 includes the lockup clutch 120 selectively coupling the front cover 36 that is the input-side rotating member of the torque converter 18 and the turbine 42 that is the output-side rotating member such that the lockup clutch 120 is disposed closer to the engine 14 relative to the turbine 42 and housed in the front cover 36.

The lockup clutch 120 is a friction engagement clutch including a disk-shaped lockup clutch piston (piston member) 124 that is coupled in a power transmittable manner to the disk portion 42c of the turbine 42 via a second damper 122 configured as a shock absorber as is the case with the first damper 102 and that is disposed in a manner allowing movement toward and away from the side wall surface of the front cover 36 so as to act as an output member of the lockup clutch 120, a lockup clutch friction plate 126 fixedly attached to a surface of the lockup clutch piston 124 opposite to the front cover 36, an engagement-side oil chamber 128 having an inner pressure increased to press the lockup clutch piston 124 toward the front cover 36 when the lockup clutch 120 is engaged, and a release-side oil chamber 130 having an inner pressure increased to press the lockup clutch piston 124 away from the front cover 36 when the lockup clutch 120 is released, such that torque is transmitted between the front cover 36 and the lockup clutch piston 124 by the friction engagement between the front cover 36 and the lockup clutch piston 124 via the lockup clutch friction plate 126. The lockup clutch 120 transmits torque via a friction surface between the lockup clutch friction plate 126 and the front cover 36. In other words, the lockup clutch 120 couples the front cover 36 and the lockup clutch piston 124 to each other via the one friction surface.

The engagement-side oil chamber 128 is formed by being surrounded by the lockup clutch piston 124, the front cover 36, the turbine blades 44, etc. The release-side oil chamber 130 is formed by being surrounded by the lockup clutch piston 124, the front cover 36, the clutch drum 106, etc. The lockup clutch 120 is a single plate clutch having a hydraulic actuator using an engine-side wall portion of the front cover 36 that is the input-side rotating member, i.e., the side wall portion 36a closer to the engine 14, as a portion of the members forming the release-side oil chamber 130, and is disposed on the outer circumferential side of the engine intermittent clutch K0.

The second damper 122 is a damper inserted in the power transmission path between the front cover 36 that is the input-side rotating member of the torque converter 18 and the turbine 42 that is the output-side rotating member and inserted in the power transmission path between the electric motor MG and the automatic transmission 20. The second damper 122 is disposed on the outer circumferential side of the first damper 102, partially overlapping with the first damper 102 when viewed in the direction orthogonal to the first axial center C1.

The release-side oil chamber 130 has both a function as an oil pressure chamber of the hydraulic actuator of the lockup clutch 120 and a function as a portion of a release-side flow passage 132 through which the operating oil flows at the time of release of the lockup clutch 120, in a circulation flow passage allowing circulation of the operating oil (fluid) between the torque converter 18 and the hydraulic control circuit 114 supplying the operating oil into the torque converter 18.

The release-side flow passage 132 is made up of a cylindrical gap 132a formed between the input shaft 48 of the automatic transmission 20 and each of the stator shaft 62 and the inner race 64a in communication with the hydraulic control circuit 114 outputting the operating oil with a pressure adjusted by using an oil pressure generated by the oil pump 24 as an original pressure, an annular gap 132b formed between a side wall portion of the inner race 64a and the flange portion 42b of the turbine 42 in communication with the annular gap 132a, a through-hole 132c penetrating the flange portion 42b of the turbine 42 in a direction parallel to the first axial center C1 in communication with the annular gap 132b, an annular gap 132d formed on the first damper 102 side of the through-hole 132c between the first damper 102/the engine intermittent clutch K0 and the lockup clutch piston 124, the release-side oil chamber 130, the engagement-side oil chamber 128, etc. The operating oil is supplied to the release-side oil chamber 130 sequentially through the cylindrical gap 132a, the annular gap 132b, the through-hole 132c, and the annular gap 132d. Therefore, the lockup clutch 120 has the release-side oil chamber 130 consisting of a portion of the release-side flow passage 132 and having an inner pressure increased by supply of the operating oil when the lockup clutch 120 is released. The cylindrical gap 132a of the release-side flow passage 132 is in communication with the hydraulic control circuit 114 through an oil passage not depicted formed in the stator shaft 62. The release-side flow passage 132 has a function as a circulation outward passage through which the fluid is flowed from the hydraulic control circuit 114 toward the inside of the torque converter 18 at the time of circulation, in the circulation flow passage allowing a large amount of the operating oil to be circulated by release of the lockup clutch 120 between the torque converter 18 and the hydraulic control circuit 114 supplying the operating oil into the torque converter 18.

Figure 4:
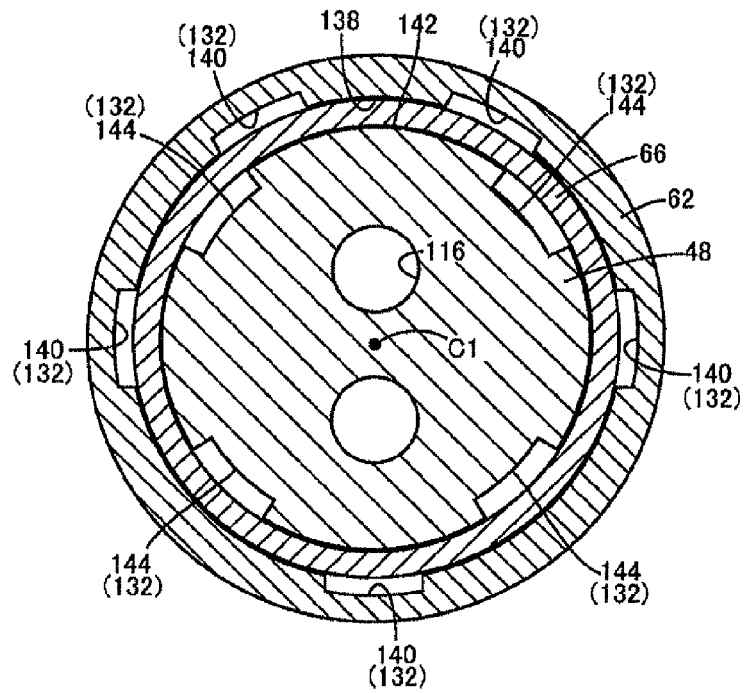
FIG. 4 is a cross-sectional view of a cross section taken along line IV-IV of FIG. 3.

In the cylindrical gap 132a, the bush 66 acting as a bearing member or a metal bearing is disposed between the input shaft 48 and the stator shaft 62. FIG. 4 is a cross-sectional view of a cross section taken along line IV-IV of FIG. 3. As depicted in FIG. 4, a plurality of (in this embodiment, five) first axial grooves 140 is circumferentially formed in a first cylindrical inner circumferential surface 138 of the stator shaft 62 opposite to an outer circumferential surface of the bush 66. A plurality of (in this embodiment, four) second axial grooves 144 is circumferentially formed in a first cylindrical outer circumferential surface 142 of the input shaft 48 opposite to an inner circumferential surface of the bush 66. The first axial grooves 140 and the second axial grooves 144 act as flow passages making up a portion of the release-side flow passage 132. The provision of the first axial grooves 140 and the second axial grooves 144 suppresses the reduction in a flow cross-section area of the release-side flow passage 132 due to the provision of the bush 66.

Figure 5:
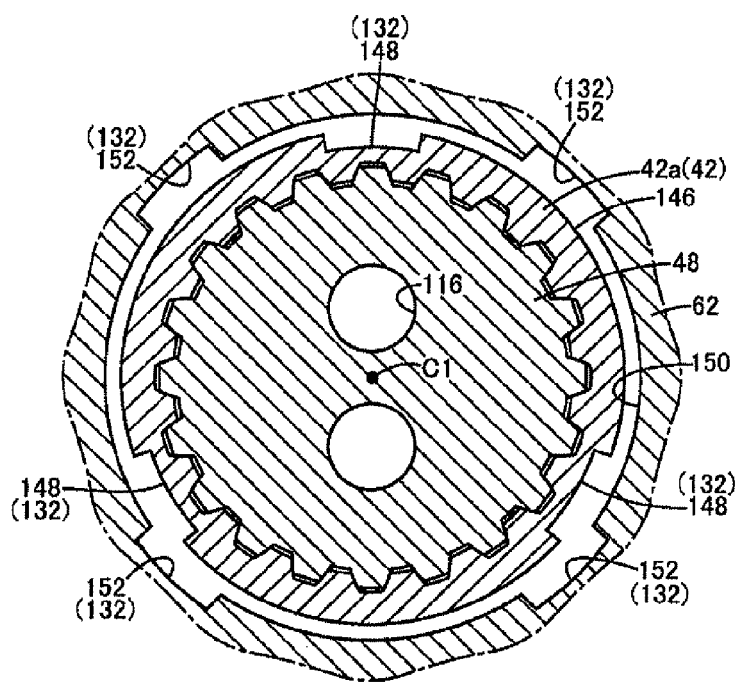
FIG. 5 is a cross-sectional view of a cross section taken along line V-V of FIG. 3.

FIG. 5 is a cross-sectional view of a cross section taken along line V-V of FIG. 3. As depicted in FIG. 5, a plurality of (in this embodiment, three) third axial grooves 148 is circumferentially formed in a second cylindrical outer circumferential surface 146 corresponding to the spline fitting portion of the boss portion 42a to the input shaft 48 in the first axial center C1 direction, in the outer circumferential surface of the boss portion 42a of the turbine 42. A plurality of (in this embodiment, four) fourth axial grooves 152 is circumferentially formed in a second cylindrical inner circumferential surface 150 corresponding to the spline fitting portion (see FIG. 3) of the stator shaft 62 to the inner race 64a in the first axial center C1 direction, in the inner circumferential surface of the stator shaft 62. The third axial grooves 148 and the fourth axial grooves 152 act as flow passages making up a portion of the release-side flow passage 132. The provision of the third axial grooves 148 and the fourth axial grooves 152 suppresses the reduction in a flow cross-section area of the release-side flow passage 132 due to the overlap between the spline fitting portion of the turbine 42 to the input shaft 48 and the spline fitting portion of the stator shaft 62 to the inner race 64a when viewed in the direction orthogonal to the first axial center C1.

As depicted in FIG. 3, a gap formed between the stator 46 and the turbine blades 44 in the release-side flow passage 132 is oil-tightly sealed by a seal member 136 on the inner circumferential side of the stator 46 and the turbine blades 44 and on the outer circumferential side of the annular gap 132b located on the radially outer circumferential side relative to the through-hole 132c. The seal member 136 is disposed between an annular protrusion projected from the side wall portion of the inner race 64a toward the flange portion 42b of the turbine 42 and an annular protrusion projected from the flange portion 42b toward the side wall portion of the inner race 64a on the inner circumferential side of the annular protrusion.

The lockup clutch 120 is subjected to engagement/release control by the hydraulic control circuit 114. In the engagement/release control, a power-transmittable torque capacity of the lockup clutch 120, i.e., an engagement force of the lockup clutch 120 is varied, for example, continuously, through pressure adjustment of a linear solenoid valve etc., in the hydraulic control circuit 114. In the engaged state of the lockup clutch 120, the front cover 36 acting as the input-side rotating member of the torque converter 18 is directly coupled to the turbine 42 acting as the output-side rotating member. Therefore, in the engaged state of the lockup clutch 120, the power from the engine 14 is input to the automatic transmission 18 sequentially through the front cover 36, the second damper 122, the turbine blade 44, and the turbine 42. On the other hand, in the released state of the lockup clutch 120, the power transmitted to the front cover 36 of the torque converter 18 is transmitted through the fluid to the turbine 42.

The torque converter 18 is provided with a portion of an engagement-side flow passage 156 through which the operating oil flows at the time of engagement of the lockup clutch 120. The engagement-side flow passage 156 is made up of an annular gap 156a formed between the rear cover 38 and the stator 46, a cylindrical gap 156b formed between the tubular pump drive shaft 58 and the inner race 64a of the one way clutch 64/the stator shaft 62 in communication with each of the annular gap 156a and the hydraulic control circuit 114, etc. The cylindrical gap 156b of the engagement-side flow passage 156 is in communication with the hydraulic control circuit 114 through an oil passage not depicted formed in the stator shaft 62. The engagement-side flow passage 156 has a function as a circulation return passage through which the fluid is flowed from the inside of the torque converter 18 toward the hydraulic control circuit 114 at the time of circulation, in the circulation flow passage allowing a large amount of the operating oil to be circulated by release of the lockup clutch 120 between the inside of the torque converter 18 and the hydraulic control circuit 114 supplying the operating oil into the torque converter 18.

The vehicle power transmission device 12 in this embodiment has the torque converter 18 in the power transmission path between the engine 14 and the drive wheels 16, the torque converter (hydraulic power transmission device) 18 including the rear cover (input-side rotating member) 38 disposed with a plurality of the pump blades 40, the turbine shaft (output-side rotating member) 42 disposed with a plurality of the turbine blades 44 receiving a fluid flow from the pump blades 40, and including the stator 46 disposed with the stator blade 45 disposed between the pump blades 40 and the turbine blades 44, the vehicle power transmission device 12 comprises: the transaxle case (case) 22 including the first chamber R1 and the second chamber R2 separated by the bulkhead 68 disposed on the opposite side of the torque converter 18 to the engine 14, the first chamber R1 housing the torque converter 18, the second chamber R2 being formed on the opposite side of the bulkhead 68 to the torque converter 18, the first chamber R1 and the second chamber R2 are oil-tightly isolated from each other by the oil seal 70 oil-tightly sealing the gap between the inner circumferential surface of the through-hole 69 formed in the bulkhead 68 and the outer circumferential surface of the tubular pump drive shaft 58, the first thrust bearing 94 is disposed between the side wall portion of the rear cover 38 closer to the bulkhead 68 and the stator 46, the first thrust bearing 94 is disposed to partially overlap with the oil seal 70 when viewed in a direction orthogonal to the first axial center C1. As a result, as compared to the case that the first thrust bearing 94 is not overlapped with the oil seal 70 when viewed in the direction orthogonal to the first axial center C1, the first thrust bearing 94 and members disposed adjacent thereto, for example, the one way clutch 64, are arranged closer to the bulkhead 68 and, therefore, a distance can be reduced between the entire outer shell cover of the torque converter 18, which houses the first thrust bearing 94 and the one way clutch 64, and the bulkhead 68. Therefore, the entire axial length of the power transmission device 12 can be made shorter.

According to the vehicle power transmission device 12 in this embodiment, the rear cover (input-side rotating member) 38 has the annular projecting portion 38a formed by projecting a portion at a radial position corresponding to the first thrust bearing 94 toward the bulkhead 68 over entire circumference in the side wall portion thereof closer to the bulkhead 68, the first thrust bearing 94 is disposed within the annular projecting portion 38a. As a result, the first thrust bearing 94 and the members disposed adjacent thereto, for example, the one way clutch 64, can be arranged closer to the bulkhead 68.

According to the vehicle power transmission device 12 in this embodiment, the torque converter 18 includes the engine intermittent clutch K0 selectively coupling the crankshaft 99 of the engine 14 and the front cover (input-side rotating member) 36 of the torque converter 18. According to this embodiment, since the first thrust bearing 94 and the one way clutch 64 are disposed closer to the bulkhead 68, the engine intermittent clutch K0 can compactly be disposed in an available space in the outer shell cover of the torque converter.

According to the vehicle power transmission device 12 in this embodiment, the electric motor MG disposed on the second axial center C2 parallel to the first axial center C1 and coupled to the rear cover (input-side rotating member) 38 via each of the tubular pump drive shaft (cylindrical rotation shaft) 58 and the electric motor coupling rotating member 84 coupled to the tubular pump drive shaft 58 is comprised, the bulkhead 68 has the supporting portion 68b formed by projecting a portion at a radial position toward the second chamber R2 over entire circumference, the electric motor coupling rotating member 84 is rotatably supported via the second bearing 90 by the supporting portion 68b of the bulkhead 68, and the annular projecting portion 38a is positioned on the inner circumferential side of the supporting portion 68b of the bulkhead 68. As a result, for example, vehicle fuel efficiency can be improved by assisting the output of the engine 14 with the electric motor MG during vehicle running with the engine 14 or by driving the vehicle with the electric motor MG while the engine 14 is stopped. Even when the electric motor coupling rotating member 84 and the supporting portion 68b of the bulkhead 68 for the rotatable support thereof are disposed to couple the electric motor MG to the rear cover 38 of the torque converter 18, the first thrust bearing 94 and the one way clutch 64 can be disposed closer to the bulkhead 68.

According to the vehicle power transmission device 12 in this embodiment, the automatic transmission (power transmission mechanism) 20 disposed on the side opposite to the engine 14 relative to the torque converter 18 in the first axial center C1 direction to transmit power from the torque converter 18 to the drive wheels 16 is comprised, the turbine 42 of the torque converter 18 is coupled to the input shaft 48 of the automatic transmission 20 on the automatic transmission 20 side relative to the pump blades 40 in the first axial center C1 direction, the stator 46 is relatively non-rotatably coupled via the one way clutch 46 to the stator shaft 62, and a coupling portion of the inner race 64a of the one way clutch 64 to the stator shaft 62 and the coupling portion of the boss portion 42a of the turbine 42 to the input shaft 48 are disposed to partially or entirely overlap with each of the first thrust bearing 94 and the oil seal 70 when viewed in a direction orthogonal to the first axial center C1. As a result, the coupling portion of the boss portion 42a of the turbine 42 to the input shaft 48 and the coupling portion of the inner race 64a of the one way clutch 64 to the stator shaft 62 are disposed out of the outer shell cover of the torque converter 18 in the first axial center C1 direction. Therefore, as compared to the case that the coupling portions are disposed within the outer shell cover, the length of the outer shell cover in the first axial center C1 direction can be made shorter and, therefore, the entire axial length of the power transmission device 12 can be made shorter.

Although one embodiment of the present invention has been described in detail with reference to the drawings, the present invention is not limited to this embodiment and may be implemented in other forms.

For example, although the torque converter 18 includes the electric motor MG disposed on the second axial center C2 parallel to the first axial center C1 of the torque converter 18 in the embodiment, the electric motor MG may not necessarily be included. Even if the torque converter 18 includes the electric motor MG, the electric motor MG may not be disposed on the second axial center C2 parallel to the first axial center C1. The electric motor MG may be included on the first axial center C1.

Although the torque converter 18 includes the engine intermittent clutch K0 and the lockup clutch 120 in the embodiment, the engine intermittent clutch K0 and the lockup clutch 120 may not necessarily be included.

Although the vehicle power transmission device 12 includes the automatic transmission 20 on the subsequent stage of the torque converter 18 in the embodiment, the automatic transmission 20 may not necessarily be included as long as a power transmission mechanism is included that has an input shaft coupled to the turbine 42 of the torque converter 18 to transmit power input to the input shaft to the subsequent stage.

Although the electric motor MG is operatively coupled to the rear cover 38 that is the input-side rotating member of the torque converter 18 via the endless annular transmission chain 88 wrapped around the first electric motor coupling gear 82 and the second electric motor coupling gear 86 in the embodiment, the electric motor MG may operatively be coupled to the rear cover 38 via, for example, a gear pair, instead of the transmission chain 88.

Although the input shaft 48 of the automatic transmission 20 is rotatably supported on the inner circumferential side of the stator shaft 62 via the bush 66 by the stator shaft 62 in the embodiment, the bush 66 is not a limitation and the input shaft 48 may be supported by other bearing members such as s needle roller bearing (needle bearing), for example.

Although the stator shaft 62 is integrally disposed on the pump cover 50 to be always non-rotatable in the embodiment, the stator shaft 62 may not always be non-rotatable. For example, the stator shaft 62 may be coupled to an output shaft of an electric motor and rotated by the electric motor to change a capacitive coefficient of the torque converter 18, or may be coupled to the pump cover 50 via a brake and selectively switched between a rotatable state and a non-rotatable state by the brake to change the capacitive coefficient of the torque converter 18.

Although the vehicle power transmission device 8 is transversely mounted along with the engine 14 on the front side of the FF (front-engine front-drive) type vehicle 6 in the embodiment, this is not a limitation and, for example, the vehicle power transmission device 12 may longitudinally or transversely be mounted on vehicles of other drive types such as an FR (front-engine rear-drive) type vehicle or an RR (rear-engine rear-drive) type vehicle, The described embodiment is a merely exemplary embodiment and, although not exemplarily illustrated one by one, the present invention may be implemented in variously modified and improved forms based on the knowledge of those skilled in the art without departing from the spirit thereof.

EXPLANATIONS OF LETTERS OR NUMERALS

12: vehicle power transmission device
14: engine
16: drive wheels
18: torque converter
20: automatic transmission (power transmission mechanism)
22: transaxle case (case)
38: rear cover (input-side rotating member)
38a: annular projecting portion
40: pump blades
42: turbine (output-side rotating member)
44: turbine blades
45: stator blade
46: stator
48: input shaft
58: tubular pump drive shaft (cylindrical rotation shaft)
62: stator shaft
64: one way clutch
64a: inner race
68: bulkhead
68b: supporting portion
70: oil seal
84: electric motor coupling rotating member
90: second bearing (bearing)
96: second thrust bearing (thrust bearing)
99: crankshaft
K0: engine intermittent clutch
MG: electric motor
R1: first chamber
R2: second chamber
C1: first axial center (axial center of the torque converter)
C2: second axial center (second axial center)

The invention claimed is:

1. A vehicle power transmission device having a torque converter in a power transmission path between an engine and drive wheels, the torque converter including an input-side rotating member disposed with a plurality of pump blades, an output-side rotating member disposed with a plurality of turbine blades receiving a fluid flow from the pump blades, and a stator disposed with a stator blade disposed between the pump blades and the turbine blades, the vehicle power transmission device comprising:

a case including a first chamber and a second chamber separated by a bulkhead disposed on an opposite side of the torque converter to the engine, the first chamber housing the torque converter, the second chamber being formed on an opposite side of the bulkhead to the torque converter, the first chamber and the second chamber being oil-tightly isolated from each other by an oil seal oil-tightly sealing a gap between an inner circumferential surface of the bulkhead and an outer circumferential surface of a cylindrical rotation shaft projected from the input-side rotating member toward the second chamber, the vehicle power transmission device being disposed with a thrust bearing between a side wall portion of the input-side rotating member closer to the bulkhead and the stator, the thrust bearing being disposed to partially or entirely overlap with the oil seal when viewed in a direction orthogonal to an axial centerline of the torque converter, a one way clutch being disposed between the stator and a non-rotating member which supports the stator, and a portion of the one way clutch protruding toward the second chamber as compared to the stator and an inner race of the one way clutch, the input-side rotating member having an annular projecting portion formed by projecting a portion at a radial position corresponding to the thrust bearing toward the bulkhead over an entire circumference in the side wall portion of the input-side rotating member closer to the bulkhead, the annular projecting portion housing the thrust bearing and the portion of the one way clutch, and the torque converter including an engine intermittent clutch selectively coupling a crankshaft of the engine and the input-side rotating member of the torque converter such that the engine intermittent clutch is housed within the input-side rotating member on the engine side of the output-side rotating member and partially or entirely overlaps with the oil seal and the thrust bearing when viewed in a direction parallel to the axial centerline.

2. The vehicle power transmission device of claim 1, comprising an electric motor disposed on a second axial centerline parallel to the axial centerline and coupled to the input-side rotating member via each of the cylindrical rotation shaft and an electric motor coupling rotating member coupled to the cylindrical rotation shaft, wherein
the bulkhead has a supporting portion formed by projecting a portion at a radial position toward the second chamber over an entire circumference, wherein
the electric motor coupling rotating member is rotatably supported via a bearing by the supporting portion of the bulkhead, and wherein
the annular projecting portion is positioned on an inner circumferential side of the supporting portion of the bulkhead.

3. The vehicle power transmission device of claim 2, comprising a power transmission mechanism disposed on the side opposite to the engine relative to the torque converter in the axial centerline direction to transmit power from the torque converter to the drive wheels, wherein
the output-side rotating member is coupled to an input shaft of the power transmission mechanism on the power transmission mechanism side relative to the pump blades in the axial centerline direction, wherein
the stator is relatively non-rotatably coupled via the one way clutch to a stator shaft, and wherein
a coupling portion of an inner race of the one way clutch to the stator shaft and a coupling portion of the output-side rotating member to the input shaft are disposed to partially or entirely overlap with each of the thrust bearing and the oil seal when viewed in a direction orthogonal to the axial centerline.

4. The vehicle power transmission device of claim 1, comprising a power transmission mechanism disposed on the side opposite to the engine relative to the torque converter in the axial centerline direction to transmit power from the torque converter to the drive wheels, wherein
the output-side rotating member is coupled to an input shaft of the power transmission mechanism on the power transmission mechanism side relative to the pump blades in the axial centerline direction, wherein
the stator is relatively non-rotatably coupled via the one way clutch to a stator shaft, and wherein
a coupling portion of an inner race of the one way clutch to the stator shaft and a coupling portion of the output-side rotating member to the input shaft are disposed to partially or entirely overlap with each of the thrust bearing and the oil seal when viewed in a direction orthogonal to the axial centerline.

5. A vehicle power transmission device having a torque converter in a power transmission path between an engine and drive wheels, the torque converter including an input-side rotating member disposed with a plurality of pump blades, an output-side rotating member disposed with a plurality of turbine blades receiving a fluid flow from the pump blades, and a stator disposed with a stator blade disposed between the pump blades and the turbine blades, the vehicle power transmission device comprising:
a case including a first chamber and a second chamber separated by a bulkhead disposed on an opposite side of the torque converter to the engine, the first chamber housing the torque converter, the second chamber being formed on an opposite side of the bulkhead to the torque converter,
the first chamber and the second chamber being oil-tightly isolated from each other by an oil seal oil-tightly sealing a gap between an inner circumferential surface of the bulkhead and an outer circumferential surface of a cylindrical rotation shaft projected from the input-side rotating member toward the second chamber,
the vehicle power transmission device being disposed with a thrust bearing between a side wall portion of the input-side rotating member closer to the bulkhead and the stator,
the thrust bearing being disposed to partially or entirely overlap with the oil seal when viewed in a direction orthogonal to an axial centerline of the torque converter,
a one way clutch being disposed between the stator and a non-rotating member which supports the stator, and a portion of the one way clutch protruding toward the second chamber as compared to the stator and an inner race of the one way clutch,
the input-side rotating member having an annular projecting portion formed by projecting a portion at a radial position corresponding to the thrust bearing toward the bulkhead over an entire circumference in the side wall portion of the input-side rotating member closer to the bulkhead,
the annular projecting portion housing the thrust bearing and the portion of the one way clutch,
an electric motor disposed on a second axial centerline parallel to the axial centerline and coupled to the input-side rotating member via each of the cylindrical rotation shaft and an electric motor coupling rotating member coupled to the cylindrical rotation shaft,
the bulkhead having a supporting portion formed by projecting a portion at a radial position toward the second chamber over an entire circumference,
the electric motor coupling rotating member being rotatably supported via a bearing by the supporting portion of the bulkhead, and
the annular projecting portion being positioned on an inner circumferential side of the supporting portion of the bulkhead.

6. The vehicle power transmission device of claim 5, comprising a power transmission mechanism disposed on the side opposite to the engine relative to the torque converter in the axial centerline direction to transmit power from the torque converter to the drive wheels, wherein
the output-side rotating member is coupled to an input shaft of the power transmission mechanism on the power transmission mechanism side relative to the pump blades in the axial centerline direction, wherein
the stator is relatively non-rotatably coupled via the one way clutch to a stator shaft, and wherein
a coupling portion of an inner race of the one way clutch to the stator shaft and a coupling portion of the output-side rotating member to the input shaft are disposed to partially or entirely overlap with each of the thrust bearing and the oil seal when viewed in a direction orthogonal to the axial centerline.

7. A vehicle power transmission device having a torque converter in a power transmission path between an engine and drive wheels, the torque converter including an input-side rotating member disposed with a plurality of pump blades, an output-side rotating member disposed with a plurality of turbine blades receiving a fluid flow from the pump blades and a stator disposed with a stator blade disposed between the pump blades and the turbine blades, the vehicle power transmission device comprising:
- a case including a first chamber and a second chamber separated by a bulkhead disposed on an opposite side of the torque converter to the engine, the first chamber housing the torque converter, the second chamber being formed on an opposite side of the bulkhead to the torque converter,
- the first chamber and the second chamber being oil-tightly isolated from each other by an oil seal oil-tightly sealing a gap between an inner circumferential surface of the bulkhead and an outer circumferential surface of a cylindrical rotation shaft projected from the input-side rotating member toward the second chamber,
- the vehicle power transmission device being disposed with a thrust bearing between a side wall portion of the input-side rotating member closer to the bulkhead and the stator,
- the thrust bearing being disposed to partially or entirely overlap with the oil seal when viewed in a direction orthogonal to an axial centerline of the torque converter,
- a one way clutch being disposed between the stator and a non-rotating member which supports the stator, and a portion of the one way clutch protruding toward the second chamber as compared to the stator and an inner race of the one way clutch,
- the input-side rotating member having an annular projecting portion formed by projecting a portion at a radial position corresponding to the thrust bearing toward the bulkhead over an entire circumference in the side wall portion of the input-side rotating member closer to the bulkhead,
- the annular projecting portion housing the thrust bearing and the portion of the one way clutch,
- a power transmission mechanism disposed on the side opposite to the engine relative to the torque converter in the axial centerline direction to transmit power from the torque converter to the drive wheels,
- the output-side rotating member being coupled to an input shaft of the power transmission mechanism on the power transmission mechanism side relative to the pump blades in the axial centerline direction,
- the stator being relatively non-rotatably coupled via the one way clutch to a stator shaft, and
- a coupling portion of an inner race of the one way clutch to the stator shaft and a coupling portion of the output-side rotating member to the input shaft being disposed to partially or entirely overlap with each of the thrust bearing and the oil seal when viewed in a direction orthogonal to the axial centerline.

* * * * *